United States Patent [19]
Hector

[11] Patent Number: 5,804,017
[45] Date of Patent: Sep. 8, 1998

[54] METHOD AND APPARATUS FOR MAKING AN OPTICAL INFORMATION RECORD

[75] Inventor: Wayne M. Hector, Shoreview, Minn.

[73] Assignee: Imation Corp., Oakdale, Minn.

[21] Appl. No.: 508,038

[22] Filed: Jul. 27, 1995

[51] Int. Cl.$^6$ .............................. B32B 31/20; B32B 31/28
[52] U.S. Cl. .................. 156/242; 156/273.7; 156/275.5; 156/285
[58] Field of Search ................................ 156/242, 273.7, 156/275.5, 285

[56] References Cited

U.S. PATENT DOCUMENTS

| | | | |
|---|---|---|---|
| 3,946,367 | 3/1976 | Wohlmut et al. | 340/173 |
| 4,219,704 | 8/1980 | Russell | 179/100.3 |
| 4,363,844 | 12/1982 | Lewis et al. | 428/65 |
| 4,385,372 | 5/1983 | Drexler | 369/109 |
| 4,430,363 | 2/1984 | Daniels et al. | 427/54.1 |
| 4,450,553 | 5/1984 | Holster et al. | 369/275 |
| 4,493,887 | 1/1985 | Peeters et al. | 430/275 |
| 4,510,593 | 4/1985 | Daniels | 369/283 |
| 4,635,076 | 1/1987 | Willson et al. | 346/135.1 |
| 4,735,878 | 4/1988 | Hamersley et al. | 430/11 |
| 4,905,215 | 2/1990 | Hattori et al. | 369/14 |
| 5,093,174 | 3/1992 | Suzuki et al. | 428/64 |
| 5,171,392 | 12/1992 | Iida et al. | 156/273.3 |
| 5,202,875 | 4/1993 | Rosen et al. | 369/94 |
| 5,255,262 | 10/1993 | Best et al. | 369/275.1 |
| 5,303,224 | 4/1994 | Chikuma et al. | 369/275.1 |
| 5,303,225 | 4/1994 | Satoh et al. | 369/275.3 |

OTHER PUBLICATIONS

"IBM Scientists Demonstrate Multilevel Optical Disks; Could Increasse Optical Data Capacities 10–Fold or More," IBM Press Release, May 12, 1994.

"New I.B.M. Laser Method Stacks Data on Disks," *N.Y. Times*, May 13, 1994.

*Primary Examiner*—Jenna Davis
*Attorney, Agent, or Firm*—Eric D. Levinson

[57] ABSTRACT

Method of making an optical information record. A substrate having a surface for carrying an information bearing layer is provided. A curable polymer is provided on said surface of the substrate. A flexible stamper is provided having an information bearing pattern on a first surface thereof, said first surface having inner and outer regions. The stamper is distorted such that the inner region of the first surface bearing the information pattern bulges outward relative to the outer region, providing the first surface with a generally convex contour in at least one direction. The distorted stamper is positioned relative to the substrate such that the convex surface of the stamper having the information bearing pattern is capable of being pressed against the surface of the substrate bearing the curable polymer on the substrate. The distorted first surface of the stamper and the polymer bearing surface of the substrate are pressed together, causing the inner region of the stamper to first contact the substrate surface and the remainder of the distorted stamper to progressively contact the remainder of the stamper surface as the respective surfaces are further pressed together, thereby distributing the polymer across the substrate surface and forming a replica of the information bearing pattern in the polymer surface. The polymer is cured, thereby fixing the replica on the cured polymer surface, to provide a formed, information bearing layer on the substrate. The substrate is separated from the stamper.

23 Claims, 2 Drawing Sheets

METHOD AND APPARATUS FOR MAKING AN OPTICAL INFORMATION RECORD

FIELD OF THE INVENTION

The present invention relates generally to methods for producing optical recording media, specifically to such methods in which an information track comprising a relief-like pattern of regions situated alternatively at a higher and a lower level is replicated in a layer of a curable polymer.

BACKGROUND OF THE INVENTION

Various methods of producing optical information records are now known. Those discussed in U.S. Pat. No. 5,171,392 (Iida, et al.) are exemplary, and are said to include an injection molding method, a compression molding method, a photopolymer (2P) method, or the like. That patent is particularly directed to a process in which a rigid, transparent stamper, formed of glass or plastic, and having a relief-like information pattern on an outer surface, is employed to allow radiation to pass therethrough to cure a radiation hardenable liquid resin sandwiched between a substrate and the outer surface of the stamper. To provide a dual-layer record, the patent further acknowledges that the substrate be provided with a first information pattern, and that that pattern be covered with a reflective layer which reflects light of a first wavelength. The stamper is provided with a second information pattern, and after that pattern is replicated in the cured resin, a reflective layer is added which reflects light of a second wavelength. The two information patterns may then be read separately by optical beams of different wavelengths.

An alternative form of a dual layer optical record is depicted in U.S. Pat. No. 4,450,553 (Holster et al.). In that record, one of the two radiation-reflecting layers is made partially transmitting to allow light of the same wavelength to be alternately focused on the respective information bearing patterns. This patent likewise suggests that the record may be made by exposing and curing a thin layer of a liquid radiation-curable lacquer with radiation directed through the layer.

U.S. Pat. No. 4,510,593 (Daniels) is further exemplary of photocurable compositions useful in making optical information records.

While the art is thus replete with teachings on the production of various types of optical records, as such records have become more and more popular, there continues to be ever greater pressure to reduce the time required to produce each record, with an attendant reduction in the cost of production and at the same time improve the quality of the record itself.

BRIEF DESCRIPTION OF THE INVENTION

Like that of the art noted above, the present invention is directed to method of making an optical information record in which a substrate is provided with a curable polymer on at least one surface.

Unlike the art, however, in the present invention, a flexible stamper is used. This stamper has an information bearing pattern on a first surface, such a pattern typically comprising a plurality of surface features provided on the surface in a track-like fashion. Most commonly such a pattern is in the form of pits or bumps arranged in concentric or spiral tracks. Examples of such patterns have been fully described, for example in Marchant: Optical Recording: A Technical Overview; Addison Wesley Publishing Co. 1990, at Chap. 2, pages 23–40. The stamper is distorted such that the inner region of the first surface bearing the information pattern bulges outward relative to the periphery, providing a generally convex contour, with the pattern on the first surface facing outward.

The distorted stamper is then positioned directly opposite the substrate such that the convex surface of the stamper is capable of being pressed against the surface of the substrate bearing the curable polymer. Those respective surfaces are then pressed together, causing the inner region of the stamper to first contact the curable polymer surface and the remainder of the distorted stamper surface to progressively contact the remainder of the curable polymer surface as the respective surfaces are further pressed together, thereby distributing the polymer across the substrate surface and forming a replica of the information bearing pattern in the polymer surface.

The polymer is cured, thereby fixing the replica on the cured surface, and the stamper is then separated from the substrate.

In most applications, a reflective surface layer may be applied over the cured replicated surface.

The substrate will have a surface for carrying a layer onto which a flexible stamper may be pressed to provide an information bearing pattern. Such a substrate may preferably comprise a disc-shaped, substantially rigid body having at least one substantially planar surface, onto which a circular, radially distorted stamper may be pressed. Alternatively, the substrate may be less than rigid, and a rigid platen may be employed below the substrate while the substrate and stamper are pressed together. Also, the flexible stamper may be other than circular. For example, it may be deformable into a cylindrical, convex contour or the like.

In preferred embodiments, a radiation curable polymer may be employed, and in such cases, the substrate may be formed of a substantially transparent material, thereby both allowing radiation to pass therethrough to cure the polymer, and to subsequently pass radiation therethrough when reading the information pattern from the replicated surface. Alternatively, the stamper may be formed of a transparent material so that radiation may pass through the stamper to cure the polymer.

While the curable polymer may be distributed as a substantially uniformly thick layer on the substrate surface before the substrate and stamper are pressed together, a dollop of polymer may be placed near the portion of the substrate which the distorted stamper will first contact as those members are pressed together, and that pressing action then substantially uniformly distribute the polymer on the substrate as those members are progressively pressed together. Likewise, the polymer may be applied by screen printing techniques.

The present invention is also readily directed to the formation of optical media in which two or more layers of optical tracks are provided. In such an embodiment, the substrate may have at least a first information pattern on its surface, a first reflector thereover, and an optical spacer over the first reflector. The step of providing the curable polymer then comprises distributing the polymer onto the exposed surface of the optical spacer. In such an embodiment, the first reflector may either be reflective of a different wavelength light, or may be semitransparent. Such an optical spacer may also intrinsically include a radiation-sensitive outer surface.

The assembly for making such an optical information record preferably comprises a manifold body defining a chamber having a first opening to which the flexible stamper may be secured such that the surface of the stamper having the information bearing pattern faces outward away from the chamber. Such an assembly further includes means for maintaining a pressure differential between the inside and outside of the chamber when the stamper is fitted thereto, the differential pressure thereby distorting the stamper such that the center of the surface having the information bearing pattern bulges outward relative to its periphery, providing a generally convex contour.

In an embodiment in which the stamper is transparent, the assembly will desirably also be at least partially transparent to allow radiation to pass first through the chamber and then the stamper to cure a radiation curable polymer. In such an embodiment, the body may include a second opening opposed to the first opening into which a transparent plate may be fitted.

Advantages obtained by the method of the present invention include at least the following:

1) A roller normally used to spread the photopolymer across the surface of the disc may be eliminated altogether, as the distorted stamper alone serves to spread the polymer. This avoids one process step, which in turn reduces complexity and cycle time.

2) The progressive spreading of the photopolymer as the distorted stamper comes into contact with the substrate surface shortens the distance that pressurized contact between the contacting surfaces must be. In other words, if the stamper is shaped like a cylinder, the length of the 'line of contact' between the stamper surface and the photopolymer on the substrate surface will be halved and will spread from the center of the disc out in two directions. If the stamper is distorted in a substantially spherical shape, the contact will spread radially from the center out. Reducing the contact distance also reduces the cycle time.

3) If the stamper is distorted into a substantially spherically shaped contour, it may be further desirable to meter the amount of photopolymer being applied as well as to monitor the relative positions of the photopolymer and stamper, thereby providing a uniform edge flash of photopolymer around the circumference of the disc after curing. E.g., any excess photopolymer will be uniformly distributed around the circumference. Preferably, such as by screen printing the photopolymer onto the substrate surface and then further radially distributing it by a spherically distorted stamper, no excess photopolymer will be present, thus eliminating edge flash altogether. This then eliminates that processing step, maintains a precise molded shape and avoids crazing.

4) As it is possible to maintain pressure on the stamper while the photopolymer is curing, it is possible to reduce the size of an ultimate defect in the completed disc resulting from debris caught between the stamper and the substrate. Without such pressure, a even a relatively small dirt particle may cause the stamper to pull away from the substrate such that the uncured photopolymer is allowed to wick away from the contact area of the particle, resulting in a much larger defect than would be associated with the particle itself, after curing.

DETAILED DESCRIPTION OF THE INVENTION

Figure 1:
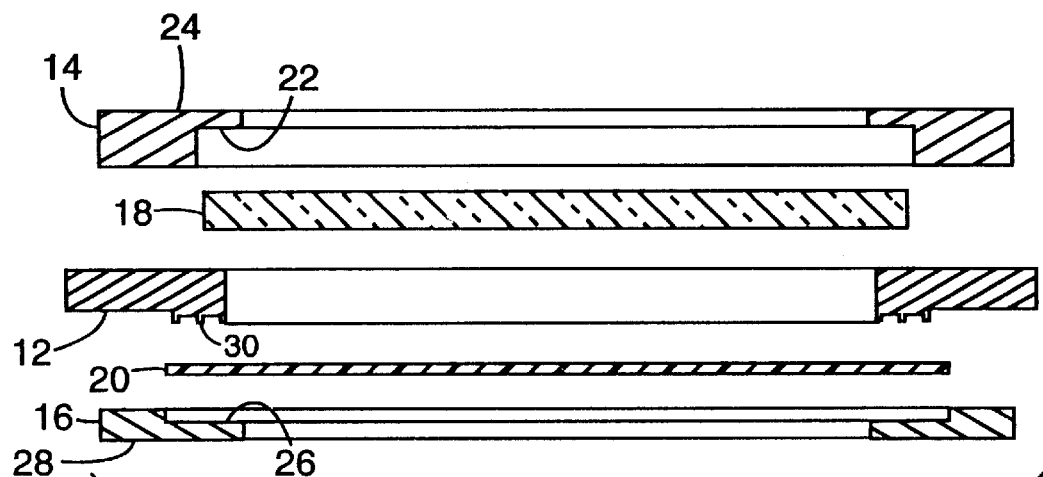
FIG. 1 is a side cross section, before assembly, of an assembly according to the present invention.

As noted above, one aspect of the present invention is directed to an apparatus for making an optical information record, in which a flexible stamper is impressed onto a substrate bearing a photocurable polymer. As shown in FIG. 1, such an apparatus comprises a manifold body 12, an upper clamp 14 and a lower clamp 16. The upper clamp 14 is designed to hermetically seal a transparent plate 18 to the upper part of body 12, while the lower clamp 16 is designed to hermetically seal the flexible stamper 20 to the lower part of the body. To facilitate such a seal, the upper clamp 14 includes an annular recess 22 into which the plate 18 is to be received, and an outer flange 24 adapted to be mated to the body 12. Similarly, the lower clamp 16 includes an annular recess 26 into which the stamper 20 may be received and an outer flange 28 adapted to be sealed to the body 12. The body 12 and clamps 14 and 16 have circular apertures allowing light to be directed therethrough.

Figure 2:
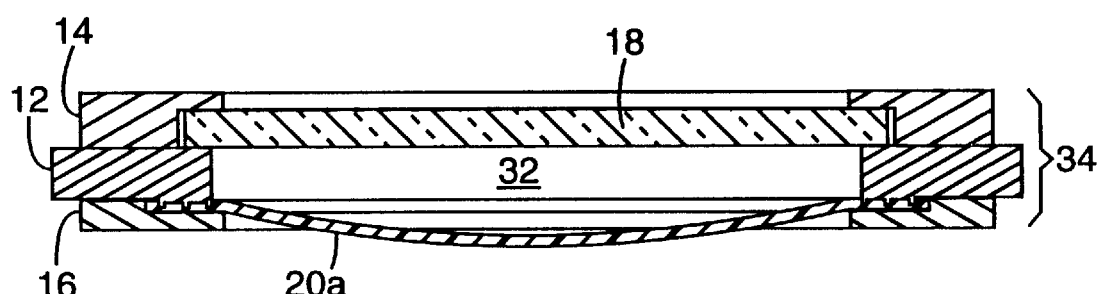
FIG. 2 is a side cross section of the assembly of FIG. 1, after it is assembled and pressurized.

As further shown, the transparent plate 18, is desirably made of a circular plate of material transparent to the radiation to be used in practicing the method of the invention. Such a material may for example, be a 9.525 mm (0.375 in.) thick piece of quartz glass. After the plate 18 is inserted in the recess 22, the outer flange 24 may be sealed to the body 12 by means of suitable screws, retainers and the like. (not shown) In a similar manner, when the stamper 20 is inserted in the recess 26 of the lower clamp 16, that clamp may be sealed to the body 12 by suitable screws, etc. To further facilitate sealing the flexible stamper 20 to the body 12, ridges 30 are provided on the body so that when the flanges on the lower clamp 16 and body are joined, the stamper will be slightly deformed. At least one opening (not shown) is provided through the side of the body 12 to allow air or other gases to be inserted into the cavity 32 formed when the members are sealed together. The completed assembly 34, in which the stamper 20a is deformed into the substantially spherical shape shown in FIG. 2, is then ready for use in practicing the method of the present invention.

The processing steps utilized with the apparatus described above to produce an information record are follows:

1) The flexible stamper 20 may, for example, be prepared from a metal master having a relief-like information pattern formed on one surface by photolithographic techniques. A negative of that pattern may then be pressed into a suitable flexible sheet of material, e.g., polyester, polycarbonate, polyurethane, or the like to form the flexible stamper utilized herein.

Figure 3:
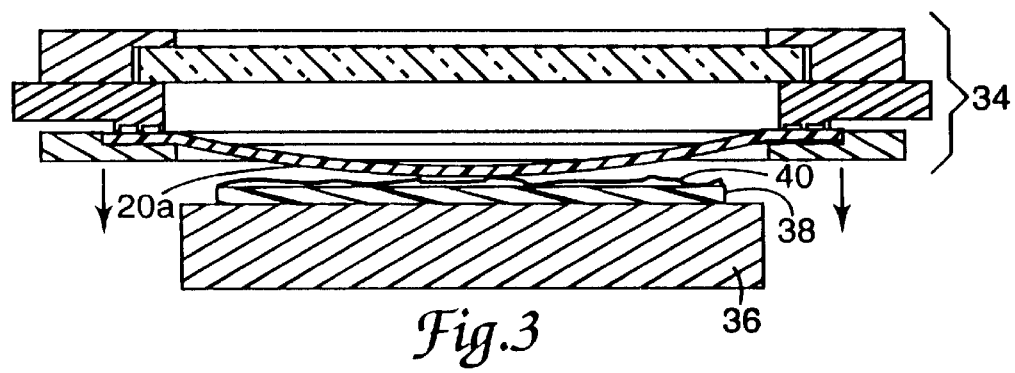
FIGS. 3–5 are side cross sections of the assembly as employed in practicing the method of the present invention.

2) As shown in FIG. 3, a platen 36 is provided to support the substrate 38 and to keep it from being deformed while the stamper is pressed against it. The substrate 38 may be any of a variety of materials such are typically used in optical records, such as sheets of polycarbonate, polymethylmethacrylate, and the like. To the outer surface of the substrate is applied a quantity of a curable resin/polymer 40, such as described in U.S. Pat. No. 4,510,593 (Daniels). The assembly 34 is then placed over the photopolymer bearing substrate, and the respective members are pressed together. As the members are progressively pressed together, the deformed stamper 20a will gradually contact all of the opposed substrate surface.

Figure 4:
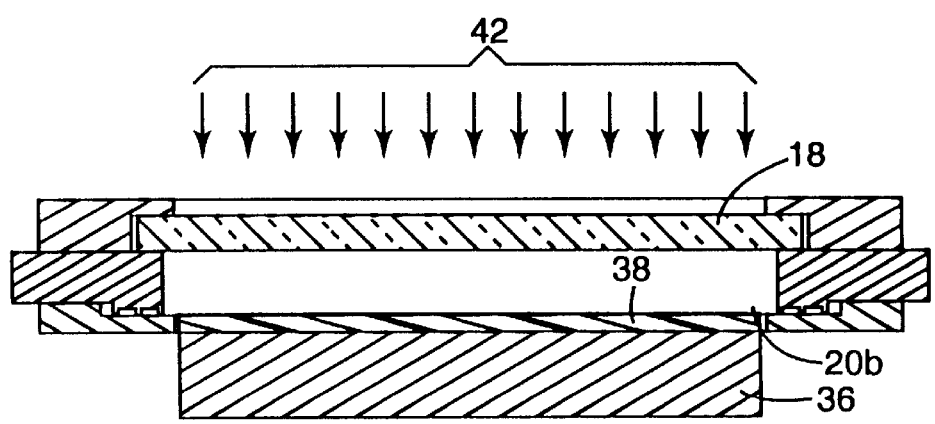

3) As shown in FIG. 4, this action also causes the photopolymer to be substantially uniformly distributed across that surface while the stamper 20b is in turn pressed flat, thereby impressing a replica of the information pattern into the photopolymer surface. UV light 42 from a suitable source (not shown) is then directed through the transparent plate 18 and stamper 20b to cure the polymer.

Figure 5:
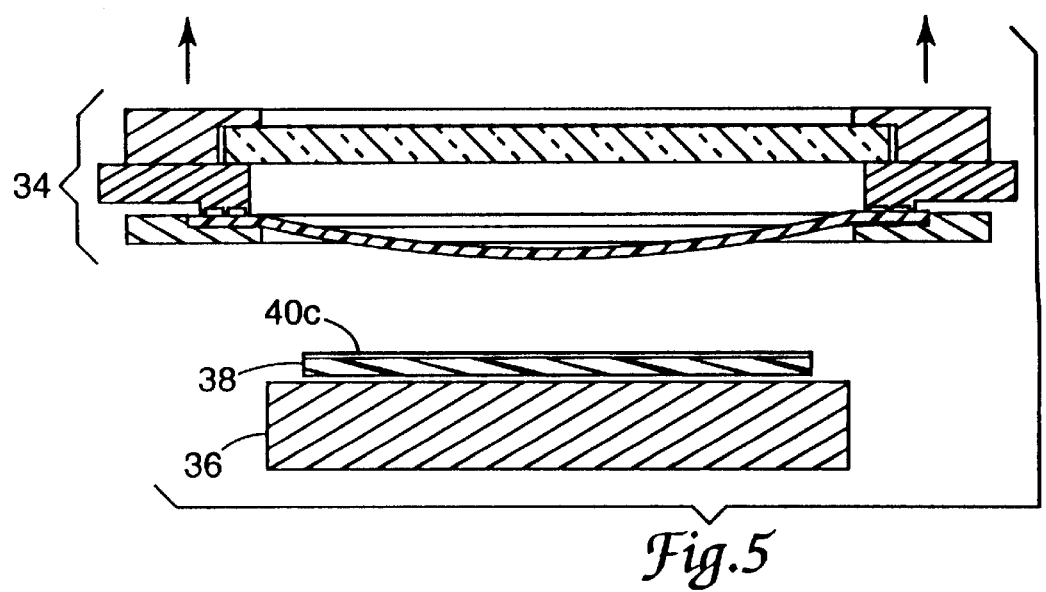

4) Finally, as shown in FIG. 5, when the polymer 40c is cured, the assembly 34 is withdrawn, and the substrate 38 bearing the cured, replica bearing polymer is removed from the platen. Additional layers, such as a reflectorized layer, layers suitable for protecting the information pattern, and for bearing printed indicia may then be provided as desired.

If desired, the photopolymer may be screen printed onto the substrate surface prior to the stamper being brought into contact. For example, a screen of 390 mesh, monofilament polyester threads may be so employed in a conventional screen printing apparatus, using a photopolymer such as described hereinafter. In such an apparatus, the contact angle, screen tension, etc., would be set to obtain complete and uniform coverage as the photopolymer was printed onto the surface of the substrate.

As an option in the practice of the present invention, the apparatus 10, the platen 36, and the substrate 38 may be placed under vacuum while having the cavity 32 maintained at a relatively higher pressure, e.g., atmospheric pressure in order to suitably distort the stamper 20. A vacuum is desirable, because it would allow the stamper 20 to be brought into contact with the photopolymer 40a, 40b, and 40c, as the case may be, much more quickly. This would reduce cycle time for making optical records when using the method of the present invention.

Figure 6:
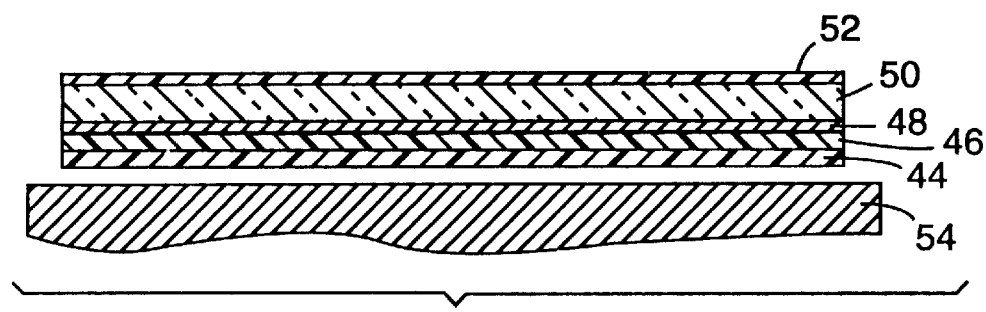
FIG. 6 is a side cross section of a portion of the assembly as employed in practicing an alternative embodiment of the present invention.

In the embodiments discussed above, the substrate has been described simply as a sheet of a suitable material, such as polycarbonate, etc. To provide a multiple layer optical record, such as discussed in U.S. Pat. Nos. 4,450,553 (Holster et al.) and 5,171,392 (Iida et al.), and Assignee's copending application U.S. Ser. No. 08/286,289, filed Aug. 5, 1994, in the names of Michael B. Hintz et al., for Dual Layer Optical Medium Having Partially Reflecting Thin Film Layer, such a substrate may already comprise a first information pattern onto which one or more additional layers containing information patterns can be added using techniques of the present invention. For example, as shown in FIG. 6, such a substrate 44 (shown as being supported on platen 54) may have a layer 46 bearing a first information pattern on its upper surface, which pattern may be formed in accordance with techniques of the present invention. Alternatively, the first information pattern can be formed on the layer 46 using conventional techniques, e.g., molding techniques. Over the layer 46 is a partially reflective layer 48, and thereover, an optical spacer layer 50. Over the spacer layer 50 is then applied the uncured photopolymer layer 52, into which a second information bearing pattern may be impressed using techniques of the present invention. Additional layers containing information patterns prepared in accordance with the claimed invention can also be added as desired. The multiple information patterns may then be played back using light of different wavelengths. More desirably, light of the same wavelength is used which is differently focused to playback information from each of the information patterns.

The present invention will now be further described with reference to the following examples.

EXAMPLE 1

A solventless radiation curable photopolymer was prepared as described in U.S. Pat. No. 4,510,593 (Daniels). The photopolymer had a viscosity of about 1200 centipoise.

A disc-shaped substrate having an outer diameter of 134.5 mm was formed from an extruded 1.2 mm thick polymethylmethacrylate (PMMA) sheet using a carbon dioxide laser set at 200 watts of power and optics having a 63 mm focal length. The sheet was positioned at the focal point of the laser, rotated at about 20 rpm and exposed to the $CO_2$ laser until the disc was severed from the sheet.

A flexible stamper was made from a 0.508 mm thick sheet of polycarbonate onto one surface of which an information bearing relief pattern had been embossed using a metalized master.

This polycarbonate sheet was secured in a stamper manifold such as shown in FIG. 1. The manifold body was machined of a 14 mm thick piece of aluminum to have an annular inner hole having a diameter of 147.3 mm. The lower surface was machined to have a series of annular ridges to aid in sealing the flexible stamper to that surface. The stamper was then positioned over the hole and secured by a clamp that pressed the stamper against the machined ridges. The stamper assembly was completed by clamping a transparent plate of 9.525 mm thick quartz against the opposing surface. The stamper was distorted by pressurizing the chamber within the manifold body to a pressure of about 3 psi, causing the center of the stamper to bulge relative to its periphery by about 6 mm.

The substrate was placed on a rigid platen and a dollop of about 2 ml of the photopolymer was applied to the approximate center of the substrate. The stamper assembly was then centered over the substrate and brought down into contact with the center area of the substrate at a rate of about 2 mm/sec by applying a downward force on the stamper assembly. The assembly was continuously forced down until the photopolymer was completely distributed across the area on the substrate opposing the information bearing pattern on the stamper. The stamper was then held in that position for about 60 sec. to allow for chemical bonding of the uncured photopolymer to the substrate surface.

UV radiation from a tubular 200 watt/inch high intensity, medium pressure mercury vapor arc lamp in a reflector was then projected through the manifold assembly and into the photopolymer while moving the lamp twice over the substrate at a rate of about 50 mm/sec.

A vacuum holddown was activated to hold the substrate, now a substantially completed optical record disc, onto the platen, and the stamper manifold assembly was removed.

The 134.5 mm substrate/disc now having the information bearing pattern replicated in the top, cured surface was then removed from the platen and placed onto a rotatable vacuum holddown chuck. The substrate/disc was axially aligned, using an optical microscope to position the information pattern to within 70 micrometers of concentricity error between the chuck center of rotation and the information pattern. As so positioned, the substrate/disc was cut into the proper size for a CD disc of 120 mm OD and 15 mm ID using the same $CO_2$ laser setup described above for cutting the substrate from the PMMA sheet.

Afterwards, a metalized reflective layer was applied over the cured photopolymer surface. The disc was placed in a standard CD player and the data from the information pattern was successfully retrieved.

EXAMPLE 2

Another optical record was prepared in accordance with Example 1, except that a different photopolymer was used. In this example, the photopolymer was prepared in accordance with procedures described in assignee's copending application U.S. Ser. No. 08/385,326, filed Feb. 8, 1995, in the names of Ha et al., Attorney's Docket No. 51202USA5A, from the following ingredients:

| Ingredient | % |
| --- | --- |
| Ethyl acetate solvent | 4.5 |
| Methanol | 4.5 |
| 1,6-Hexanediol Diacrylate | 23.0 |
| trimethylolpropane Triacrylate | 42.6 |
| EB605 (from Radcure, Inc.) | 13.6 |
| FC171 (A commercial surfactant from 3M Company) | 1.36 |
| Lithium Bis(trifluoromethylsufonyl)imide | 0.45 |
| acrylated polysiloxane | 0.90 |
| Irgacure (a commercial photoinitiator from Ciba-Giegy Co.) | 4.5 |
| Darocure 1173 (a commercial photoinitiator from Ciba-Giegy Co.) | 4.5 |

This solution had a viscosity of about 15 centipoise, and the resultant optical disc was microscopically shown to have a data pattern similar to that of Example 1.

While this invention has been described in connection with specific embodiments, it should be understood that it is capable of further modification. The claims herein are intended to cover those variations which one skilled in the art would recognize as the chemical equivalent of what has been described herein. Thus, various omissions, modifications, and changes to the principles described herein may be made by one skilled in the art without departing from the true scope and spirit of the invention which is indicated by the following claims.

I claim:

1. A method of making an optical information record, comprising the steps of
    a) providing a substrate having a surface for carrying an information bearing layer,
    b) providing a curable polymer on said surface of the substrate,
    c) providing a flexible stamper having an information bearing pattern on a first surface thereof, said first surface having inner and outer regions, wherein the step of providing a stamper comprises providing an assembly including a manifold body, defining a chamber having a first opening and a second opening opposed to said first opening, and securing the stamper to the first opening such that the surface of the stamper having the information bearing pattern faces outward away from the chamber,
    d) subjecting the outside of the chamber to a vacuum to provide a differential pressure between the inside and outside of the chamber to distort the stamper such that the inner region of the first surface bearing the information pattern bulges outward relative to the outer region, providing the first surface with a generally convex contour in at least one direction,
    e) positioning the distorted stamper relative to the substrate such that the convex surface of the stamper having the information bearing pattern is capable of being pressed against the surface of the substrate bearing the curable polymer on the substrate,
    f) pressing the distorted first surface of the stamper and the polymer bearing surface of the substrate together, causing the inner region of the stamper to first contact the substrate surface and the remainder of the distorted stamper to progressively contact the remainder of the stamper surface as the respective surfaces are further pressed together, thereby distributing the polymer across the substrate surface and forming a replica of the information bearing pattern in the polymer surface,
    g) curing the polymer while maintaining the pressure differential, thereby fixing the replica on the cured polymer surface, to provide a formed, information bearing layer on the substrate, and
    h) separating the stamper from the substrate.

2. A method according to claim 1, further comprising applying a reflective surface layer over the cured replicated surface of the information bearing layer.

3. A method according to claim 1, further comprising supporting the substrate on a rigid platen while the substrate and stamper are pressed together.

4. A method according to claim 1, wherein the step of providing a substrate comprises providing a disc-shaped, substantially rigid substrate having at least one substantially planar surface.

5. A method according to claim 1, wherein the curable polymer is a radiation curable polymer, and the step of curing the polymer comprises exposing it to actinic radiation.

6. A method according to claim 5, wherein the step of providing a substrate comprises providing a substantially transparent substrate, thereby allowing radiation to pass therethrough to cure said radiation curable polymer.

7. A method according to claim 5, wherein the radiation curable polymer is UV curable and the actinic radiation is UV radiation.

8. A method according to claim 1, wherein the step of providing a curable polymer comprises distributing a substantially uniformly thick layer of polymer on the substrate surface before the substrate and stamper are pressed together.

9. A method according to claim 8, wherein said substantially thick layer of curable polymer is applied by screen printing.

10. A method according to claim 1, wherein the step of providing a curable polymer comprises providing a dollop of polymer near the portion of the substrate which the distorted stamper will first contact as those members are pressed together, and allowing that pressing action to substantially uniformly distribute the polymer on the substrate as those members are progressively pressed together.

11. A method according to claim 1, wherein the step of providing the curable polymer comprises rotating the substrate about an axis and applying a quantity of the polymer onto the surface of the substrate, thereby spin-coating the polymer onto the substrate surface.

12. A method according to claim 1, wherein the step of providing said assembly comprises providing a clamp adapted to surround the periphery of said stamper and to be secured to the body, thereby sealing the stamper to the first opening in the body.

13. A method according to claim 1, comprising removably securing the stamper to the manifold body.

14. A method according to claim 1, wherein the manifold body includes a second opening opposed to said first opening, and said assembly further comprises a plate secured to said body in a manner such that the plate overlies the second opening.

15. A method according to claim 14, comprising removably securing the plate to the manifold body.

16. A method according to claim 14, wherein the step of providing said assembly comprises providing a second clamp adapted to surround the periphery of the plate and to be secured to the manifold body, thereby sealing the plate to the second opening in the manifold body.

17. A method according to claim 14, wherein said curable polymer is curable by actinic radiation, the plate and stamper are both transparent to such radiation, and the step of curing the polymer comprises directing such radiation through the plate, manifold chamber and stamper.

18. A method according to claim 1, wherein the step of providing said assembly comprises providing a substantially air-tight, sealed chamber.

19. A method according to claim 1, wherein the step of distorting the stamper comprises pressurizing the chamber.

20. A method according to claim 1, wherein the step of providing said substrate comprises providing a substrate having at least a first information pattern on the surface thereof, a semitransparent reflector thereover, and an optical spacer over the semitransparent reflector, and the step of providing the curable polymer comprises distributing the polymer onto the exposed surface of the optical spacer.

21. A method according to claim 20, wherein the curable polymer is provided onto the exposed surface of the optical spacer.

22. A method according to claim 20, wherein the step of providing a curable polymer comprises distributing a substantially uniformly thick layer of polymer on the substrate surface before the substrate and stamper are pressed together.

23. A method according to claim 22, wherein said substantially thick layer of curable polymer is applied by screen printing.

* * * * *

UNITED STATES PATENT AND TRADEMARK OFFICE
CERTIFICATE OF CORRECTION

PATENT NO. : 5,804,017
DATED : September 8, 1998
INVENTOR(S) : Hector

It is certified that error appears in the above-identified patent and that said Letters Patent is hereby corrected as shown below:

On the title page, under U.S. PATENT DOCUMENTS, the following should be added:
--5,234,717  08/93   Matsuno et al.
5,292,550   03/94   Fujii et al.--

On the title page, before OTHER PUBLICATIONS, the following should be added:

--FOREIGN DOCUMENTS
WO 81/02236   08/81   PCT
WO 88/09990   12/88   PCT
0 487 138 A2  05/92   Europe
59-42933      03/84   Japan
62-287448     12/87   Japan--

Signed and Sealed this

Tenth Day of July, 2001

Attest:

NICHOLAS P. GODICI
Attesting Officer
Acting Director of the United States Patent and Trademark Office